United States Patent Office 3,738,841
Patented June 12, 1973

---

3,738,841
SUGAR SYRUP FOR BREAD DOUGH PREPARATION
Vincent A. Toscano, Queens Village, N.Y., assignor to Amstar Corporation, New York, N.Y.
No Drawing. Filed Aug. 13, 1971, Ser. No. 171,483
Int. Cl. A21d 2/18
U.S. Cl. 99—90 R                9 Claims

---

ABSTRACT OF THE DISCLOSURE

An improved bread dough is prepared by incorporating in the dough along with other bread dough-making ingredients a syrup consisting essentially of sucrose and invert sugar (dextrose and levulose) as the only dissolved sugars. A suitable syrup would contain about 76.5% by weight dissolved sugars, the dissolved sugars being made up of about 50% by weight sucrose, about 25% by weight dextrose and about 25% by weight levulose. An especially useful syrup would also contain dissolved therein water-soluble autolyzed brewer's yeast in an amount in the range from about 25 parts per million to about 500 parts per million based on the weight of said syrup.

---

This invention in one embodiment relates to sugar syrups useful in the preparation of bread dough. In accordance with another embodiment this invention is directed to a bread making process employing a special dough composition. In accordance with another embodiment this invention is directed to an aqueous sugar syrup having improved properties and particularly useful as a component or carbohydrate source for use in bread dough preparation.

In the preparation of bread dough it has been the practice for a number of year to employ corn syrup as the primary sweetener and carbohydrate source. In the past few years, however, continuous dough preparation systems have been employed by the larger bread manufacturers or bakers. A continuous dough preparation system is disclosed in U.S. Pat. 2,953,460 which issued Sept. 20, 1960 in the name of J. C. Baker. The disclosures of this patent are herein incorporated and made part of this disclosure.

In commercially available continuous dough making systems which are characterized by a fast throughput in the brew stage the time the yeast is in contact with the carbohydrates (sugars) in the dough is substantially reduced as compared with other dough making systems. This reduction of the contact time of the yeast with the carbohydrate or sugar, together with the fact that bakers' yeast, another dough component, is no longer grown on cereal grains and thus does not contain the enzyme maltase which is necessary to hydrolyze maltose, results in the maltose sugar content of the dough not being fermented by the yeast. The maltose, a component of corn syrup, remains as a non-fermentable and non-fermented sugar in the baked bread dough, contributing very little to crust color, residual sweetness, bread volume or hygroscopicity.

It has been proposed to blend an inevrt sugar syrup (containing dissolved dextrose and levulose) with corn syrup, such as 71 D.S. corn syrup, and employ the blend in the preparation of bread making dough. The use of this blend in the preparation of a bread making dough is an attempt to employ the relatively inexpensive corn syrup solids while at the same time providing a source of additional fermentable solids, especially levulose, which would remain in the baked bread loaf as a residual sugar contributing to crust color and sweetness. The results, however, of employing a blend of invert sugar (dextrose and levulose), together with corn syrup solids (sugars) in the preparation of a bread dough and the baking of bread therefrom have not been completely satisfactory.

In the preparation of a bread making dough the primary reason for the addition of carbohydrates, such as sugar, to the bread dough is to provide food for the yeast in the dough with the resultant production of carbon dioxide. The resulting produced carbon dioxide raises the bread loaf, giving it volume. Other products of the fermentation are alcohol and certain organic acids which help to give the baked loaf an appetizing and desirable aroma. The carbohydrate or sugar components of the dough also serve to develop an appealing or appetizing crust color in the baked loaf due to the reaction of reducing residual sugars and bread proteins, as well as due to the caramelization of the residual sugars. An attractive and appealing crust color is especially important since it is a general practice to package bread in a transparent plastic wrapper or bag. The residual sugars left after fermentation desirably should be as sweet as possible since the sugar content of the dough after fermentation is relatively small. Accordingly, the sweeter these residual sugars are the more important or significant the contribution of the sugars to the final flavor of the bread. Desirably, also, the residual sugars should be of a type which hold moisture, such as by hydrate formation. This ability of the residual sugars to retain moisture not only contributes to the initial softness of the baked loaf but is also an important consideration to maintaining a longer shelf life, thereby cutting down on the bakers' loss due to returns of stale loaves.

As indicated hereinabove, the use of corn syrups for dough manufacture for bread baking has been attractive since corn syrup is an inexpensive source of carbohydrates in bread making. Corn syrups sold for dough manufacture are sold or characterized on the basis of dextrose equivalence or dextrose equivalent (D.E.). Dextrose equivalent is the measure of the percent fermentable carbohydrate present in the corn syrup. Dextrose equivalent is the most common means of describing the amount of conversion a corn syrup undergoes between zero D.E. which is starch and 100 D.E. which is pure dextrose. Typical cross-sectional profiles of corn syrups of various D.E. are as follows.

| Dextrose equivalent (D.E.) | Percent dextrose | Percent maltose | Percent higher saccharides |
|---|---|---|---|
| 42 | 19 | 14 | 67 |
| 54 | 31 | 18 | 51 |
| 61 | 35 | 30 | 35 |
| 71 | 40 | 35 | 25 |

The above data illustrate that corn syrups are, in fact, a complex mixture of a simple monosaccharide (e.g. dextrose), a disaccharide (e.g. maltose) and higher saccharides. During dough fermentation the available simple sugars, such as dextrose and levulose, as well as sucrose are readily and easily broken down by the yeast. For example, sucrose is readily broken down to dextrose and levulose which are simple sugars and are 100% fermentable by yeast in the relatively short time available in high speed bread production employing continuous dough preparation systems.

As indicated hereinabove, dextrose is found in corn syrups and the amount present varies with the degree of the conversion of the particular corn syrup. In a 71 D.E. corn syrup only 40% of the sugars is readily fermentable dextroes. The balance of the sugars present is, as indicated hereinabove, made up of 35% maltose which is not fermentable under the conditions of high speed dough making and bread making together with another 25% of substantially non-fermentable polysaccharides. Accordingly, D.E. value is not an accurate means of determining percent fermentability of a corn syrup. Further, the polysaccharides present in corn syrup make no substantial contribution to the production of desirable properties in a finished bread loaf, such as flavor, texture, crust color, side wall strength and the like. On the contrary, polysaccharides in the corn syrups when employed in bread dough preparation tend to dilute or lessen the strength of the dough, cause lean doughs and contribute to keyholing at the bread slicer. Further, the residual sugars left by corn syrup in the baked bread have substantially zero absorption value, i.e. they carry or absorb no water, and accordingly make no contribution to enhance bread freshness nor do they increase yield due to the increased weight of the retained moisture.

Accordingly, it is an object of this invention to provide an improved sugar syrup useful for dough preparation.

It is another object of this invention to provide an improved bread dough composition containing a special sugar syrup in accordance with this invention.

It is yet another object of this invention to provide an improved process for the manufacture of bread, particularly in a bread manufacturing process employing a continuous dough or dough making system.

How these and other objects of this invention are accomplished will become apparent in the light of the accompanying disclosure. In at least one embodiment of the practice of this invention at least one of the foregoing objects will be achieved.

In accordance with this invention it has been discovered that a sugar syrup containing sucrose and invert sugar (dextrose and levulose) as the only dissolved sugars therein provides a superior dough, particularly a dough especially useful in continuous dough making systems for the manufacture of bread therefrom. The dissolved sugar content of a syrup employed in the preparation of a bread making dough in accordance with this invention consists essentially of about 50% by weight sucrose, about 25% by weight dextrose and about 25% by weight levulose. The syrup in accordance with this invention has a sugar content of about 76–77% by weight.

In acocrdance with a special embodiment of this invention improved results are obtainable when there is incorporated in the sucrose-invert sugar-containing syrups in accordance with this invention a minor amount by weight of water-soluble autolyzed brewer's yeast, such as an amount in the range from about 25 p.p.m. by weight to about 500 p.p.m. by weight based on the weight of the syrup.

The water-soluble autolyzed brewer's yeast employed as a component in compositions in accordance with this invention contains high levels of available total nitrogen, amino nitrogen, peptides, peptones, together with most of the "B'" complex vitamins and growth factors obtainable by enzymatic digestion of brewer's yeast. The water-soluble autolyzed brewer's yeast has a total moisture content in the range from about 2.8% to about 25.2%, a total nitrogen content in the range from about 6.5 to about 9.6% and an amino nitrogen content in the range from about 2.8 to about 4.4%, a total ash content in the range from about 9.2 to about 23.1%, a total chloride content in the range from about 0.2 to about 11.1%, the aforesaid percentages being percents by weight. The autolyzed brewer's yeast employed in the preparation of sugar syrup compositions in accordance with this invention is fiber free, contains no fat and is substantially 100% water-soluble.

One autolyzed brewer's yeast composition sold under the trademark STA-MINO D–100 Powder by A. E. Staley Mfg. Co., Decatur, Ill., is a light brown, hygroscopic brewer's yeast extract (autolyzate) available in spray dried form. This material is completely water-soluble, has negligible amounts of fat, fiber and chlorides and most, if not all, of the water-soluble amino acids present in the original protein source are also present in this material.

This material analyzes 2.8% total moisture, 9.6% total nitrogen, 4.4% amino nitrogen, 11.5% total ash and 0.2% total chloride.

Another brewer's yeast autolyzate useful in the preparation of compositions in accordance with this invention is sold under the trademark STA-MINO P–100 Paste by A. E. Staley Mfg. Co. This material is a dark brown, water-soluble semi-solid, material produced by autolyzing brewer's yeast, which is aged, filtered to remove water-insolubles and then vacuum concentrated. Salt is added before aging to assist in precipitating or removing undesirable peptides. This material analyzes 24.3% total moisture, 6.5% total nitrogen, 2.8% amino ntirogen, 23.1% total ash and 11.1% total chloride.

Another brewer's yeast autolyzate useful in the preparation of compositions in accordance with this invention is sold under the trademark STA-MINO P–200 Paste by A. E. Staley Mfg. Co. This material is substantially the same as the above-described STA-MINO P–100 Paste, save salt is not added prior to aging. This material analyzes 25.2% total moisture, 7.5% total nitrogen, 3.3% amino nitrogen, 9.2% total ash and 0.3% total chloride.

Other substantially water-soluble autolyzed brewer's yeast compositions analyzing within the ranges set forth hereinabove and being at least 70% by weight water-soluble are useful in the practice of this invention.

A substantially water-soluble autolyzed brewer's yeast composition, like the product STA-MINO D–100 mentioned hereinabove, found to be particularly useful in the practices of this invention analyzes about 57.4% by weight protein, as assayed by A.O.A.C., 15 (1965), 10th edition. The amino acid content of this material as assayed by the method of Moore, Stein & Spackman, Anal. Chem., 30, 1190–1206 (1958), is as follows:

| Amino acid: | Mg./gm. |
|---|---|
| Lysine | 37.5 |
| Histidine | 11.3 |
| Ammonia | 6.37 |
| Arginine | 14.8 |
| Aspartic | 43.6 |
| Threonine | 20.5 |
| Serine | 21.2 |
| Glutamic | 52.1 |
| Proline | 20.2 |
| Glycine | 25.8 |
| Alanine | 38.0 |
| Valine | 20.4 |
| Methionine | 7.62 |
| Isoleucine | 23.4 |
| Leucine | 34.3 |
| Tyrosine | 14.0 |
| Phenylalanine | 18.8 |
| Tryptophan | 5.14 |

Illustrative of the practices of this invention a number of bread dough compositions were prepared and baked. The resulting produced bread was then evaluated. In these tests, which were run in triplicate with a batch size of 200 pounds of dough having a yield of 150 one pound loaves of bread per batch, there were employed the following dough compositions:

(I) 71 D.E. corn syrup as the source of fermentable sugar solids in the dough;
(II) A sugar syrup containing sucrose and invert sugar (50–50 dextrose and levulose) as the only fermentable sugar solids in the dough;
(III) A sugar syrup containing sucrose and invert sugar (50–50 dextrose and levulose) as the only fermentable sugar solids in the dough, together with 25 p.p.m. water-soluble brewer's yeast (STA-MINO D–100);
(IV) A sugar syrup containing sucrose and invert sugar (50–50 dextrose and levulose) as the only fermentable sugar solids in the dough, together with 50 p.p.m. water-soluble brewer's yeast (STA-MINO D–100);

(V) A sugar syrup containing sucrose and invert sugar (50-50 dextrose and levulose) as the only fermentable sugar solids in the dough, together with 500 p.p.m. water-soluble brewer's yeast (STA-MINO D-100);

(VI) A sugar syrup containing sucrose and invert sugar (50-50 dextrose and levulose) as the only fermentable sugar solids in the dough, with 50 p.p.m. STA-MINO D-100 and 10% less yeast.

The evaluation of the baked loaves was as follows:

Crust color.—the loaves prepared from dough composition IV (medium invert+50 p.p.m. STA-MINO D-100) had the darkest and most appealing color. The loaves made from dough composition I (corn syrup) and V scored lowest as to crust color.

Proof time.—the time required of the baked bread to proof to template was as follows:

| Dough composition: | Time, mins. |
|---|---|
| I | 63 |
| II | 62 |
| III | 60 |
| IV | 57 |
| V | 64 |
| VI | 61 |

The bread was scored on the following characteristics:

External appearance.—crust color, evenness of bake, symmetry of form, break and shred, volume and character of crust.

Internal appearance.—grain, color of crumb, texture, odor (flour) and taste.

Out of a possible maximum score of 100, the following scores were developed:

| Dough composition: | Score |
|---|---|
| I | 92.00 |
| II | 92.50 |
| III | 93.00 |
| IV | 95.50 |
| V | 92.50 |
| VI | 93.50 |

Therefore, based on actual test bakes the following conclusions may be drawn concerning the use of syrups having a composition in accordance with this invention plus 50 p.p.m. water-soluble autolyzed brewer's yeast.

(1) Based on replacing the fermentable solids in corn syrup, only 40% as much of a syrup in accordance with this invention is required.

(2) The resulting loaf compensated for corn syrup solids loss by flour and water scores higher than a corn syrup sweetened loaf.

(3) Tests indicate a shelf life of 12 hours longer for a bread loaf produced from syrups in accordance with this invention.

(4) The use of 10% less yeast is indicated when using a syrup in accordance with this invention.

The sugar syrup employed in the preparation of the syrup compositions in accordance with this invention can readily be prepared by blending a refined sucrose syrup with an invert syrup. Such syrups are usually readily available in a sugar refinery. The syrups employed are desirably refined syrups, substantially water white, but some amount of color in the syrup and in the resulting blend of sucrose syrup and invert syrup is tolerable. As indicated hereinabove, it is preferred in the practices of this invention to employ a syrup having a sugar solids content in the range 76-77% by weight based on the syrup. Of the dissolved sugar content the sucrose should preferably comprise about 50% by weight and the invert sugars (dextrose and levulose) should comprise the remainder, the dextrose and levulose content being present in substantially equal amounts by weight.

Although as described herein the water-soluble autolyzed brewer's yeast is employed in syrup compositions in accordance with this invention in amounts in the range from about 50 p.p.m. to about 500 p.p.m., small amounts as low as 20-25 p.p.m. would appear to be effective as well as larger amounts upwards to about 0.15% by weight, e.g. 500-1500 p.p.m.

In the preparation of dough compositions in accordance with this invention the incorporation therein of a sugar syrup in accordance with the following composition is preferred:

| | |
|---|---|
| Color | 25-85 A.S. units. |
| Sediment | #2-#4 fine disc. |
| Ash | 0.05-0.07 wet basis. |
| Solids | 76.3-76.7. |
| Percent invert | 38.0-46.0 wet basis. |
| Percent sucrose | 30.0-38.0 wet basis. |
| pH | 4.7-5.3. |
| Water-soluble autolyzed brewer's yeast (fermentation nutrient) | 50 p.p.m. |

As will be apparent to those skilled in the art in the light of the foregoing disclosure, many modifications, alterations and substitutions are possible in the practice of this invention without departing from the spirit or scope thereof.

I claim:

1. In the preparation of a bread making dough containing yeast and a carbohydrate substrate for the growth of yeast in said dough, the improvement which comprises providing in said dough as a carbohydrate substrate for the growth of the yeast therein an aqueous syrup containing dissolved therein sucrose and invert sugar as the only dissolved sugars together with from about 25 parts per million to about 500 parts per million by weight water-soluble autolyzed brewer's yeast, said parts per million by weight being based on the weight of said syrup, the dissolved sugars in said syrup being made up of about 50% by weight sucrose, 25% by weight dextrose and 25% by weight levulose and comprising about 76-77% by weight of said syrup.

2. In the preparation of a bread making-dough in accordance with claim 1 wherein said water-soluble autolyzed brewer's yeast is present in said syrup in an amount of about 25 parts per million by weight.

3. In the preparation of a bread making dough in accordance with claim 1 wherein said water-soluble autolyzed brewer's yeast is present in said syrup in an amount of about 50 parts per million by weight.

4. In the preparation of a bread making dough in accordance with claim 1 wherein said water-soluble autolyzed brewer's yeast is present in said syrup in an amount of about 500 parts per million by weight.

5. A composition useful in the preparation of a bread making dough for the growth of yeast therein in a bread dough fermentation process consisting essentially of a refined aqueous sugar syrup containing sucrose, dextrose and levulose dissolved therein together with water-soluble autolyzed brewer's yeast, said water-soluble brewer's yeast being dissolved in said syrup in an amount in the range from about 25 parts per million by weight to about 500 parts per million by weight, said parts per million by weight being based on the weight of said syrup, the dissolved sugars in said syrup consisting essentially of about 50% by weight sucrose, about 25% by weight dextrose and about 25% by weight levulose and comprising about 76-77% by weight of said syrup.

6. A composition in accordance with claim 5 wherein said water-soluble autolyzed brewer's yeast is dissolved in said syrup in an amount of about 25 parts per million by weight.

7. A composition in accordance with claim 5 wherein said water-soluble autolyzed brewer's yeast is dissolved in said syrup in an amount of about 50 parts per million by weight.

8. A composition in accordance with claim 5 wherein said water-soluble autolyzed brewer's yeast is dissolved in said syrup in an amount of about 500 parts per million by weight.

9. A composition in accordance with claim 5 wherein said water-soluble autolyzed brewer's yeast is substantially fiber-free, contains substantially no fat, is substantially 100% soluble in water and has a total nitrogen content in the range from about 6.5 to about 9.6% by weight, an amino nitrogen content in the range from about 2.8 to about 4.4% by weight, a total ash content in the range from about 9.2 to about 23.1% by weight and a chloride content in the range from about 0.2 to about 11.1% by weight.

References Cited
UNITED STATES PATENTS 2,534,694  12/1950  Blann _____ 127—41
3,632,446  1/1972  Prince et al. _____ 127—41

RAYMOND N. JONES, Primary Examiner

J. R. HOFFMAN, Assistant Examiner

U.S. Cl. X.R.

99—142; 127—30